United States Patent [19]

Williams

[11] 4,300,352

[45] Nov. 17, 1981

[54] HYDRAULIC PRESSURE INTEGRATOR

[75] Inventor: Henry L. Williams, Oklahoma City, Okla.

[73] Assignee: The Geolograph Company, Oklahoma City, Okla.

[21] Appl. No.: 73,707

[22] Filed: Sep. 10, 1979

[51] Int. Cl.[3] .................................................. B60T 7/00

[52] U.S. Cl. .......................................... 60/567; 60/581; 92/68

[58] Field of Search .......................... 92/48, 68, 37, 38; 60/567, 583, 593, 571, 581; 417/426, 427, 429; 137/86

[56] References Cited

U.S. PATENT DOCUMENTS

| | | | |
|---|---|---|---|
| 1,513,870 | 11/1924 | Sparrow | 92/37 |
| 1,711,066 | 4/1929 | Smoot | 92/48 |
| 2,168,397 | 8/1939 | De Giers | 92/37 |
| 2,198,965 | 4/1940 | Habig | 92/37 |
| 2,274,254 | 2/1942 | Newton | 92/38 |
| 2,337,455 | 12/1943 | Davis | 92/48 |
| 2,577,613 | 12/1951 | Friberg | 92/48 |
| 2,596,032 | 5/1952 | Keef | 73/744 |
| 2,634,743 | 4/1953 | Audemar | 60/567 |
| 3,420,147 | 1/1969 | Beach | 137/86 |
| 3,448,753 | 6/1969 | Marucci | 137/86 |
| 3,481,444 | 12/1969 | Mittmann | 400/677 |
| 3,694,108 | 9/1972 | Pensa | 417/426 |
| 3,737,073 | 6/1973 | Lupert | 417/426 |
| 3,766,835 | 10/1973 | Kobelt | 92/68 |

FOREIGN PATENT DOCUMENTS

| | | | |
|---|---|---|---|
| 598479 | 5/1925 | France | 92/68 |

*Primary Examiner*—Abraham Hershkovitz
*Attorney, Agent, or Firm*—William S. Dorman

[57] ABSTRACT

A hydraulic pressure integrator for averaging a plurality of independent input pressures comprising a base plate, a pivot plate mounted above the base plate for pivotal movement about a horizontal pivot axis disposed above and parallel to the base plate, a plurality of input cylinders mounted between the base plate and the pivot plate, each input cylinder having a slidable input piston mounted therein and adapted to contact the pivot plate along a given side of the pivot axis, and a single output cylinder mounted between the base plate and the pivot plate and having an output piston slidably mounted therein and adapted to contact the base plate on a side of the pivot axis opposite from the input pistons, each input cylinder receiving one of the independent input pressures. When the input pressures raise the input pistons contacting the pivot plate, the resulting force creates a torque along the pivot axis, thereby depressing the output piston and producing an output pressure from the output cylinder which is an average of the input pressures.

1 Claim, 3 Drawing Figures

HYDRAULIC PRESSURE INTEGRATOR

BACKGROUND OF THE INVENTION

1. Field of the Invention

This invention relates to an apparatus for averaging a plurality of independent pressures and provides a single output which represents the average of the independent pressures.

2. The Prior Art

A prior art device shown in U.S. Pat. No. 2,596,032, employs hydraulic cylinders to measure a plurality of pressures. However, the aforementioned device uses a sliding weight with pressure changes transmitted to a balance beam. In U.S. Pat. No. 3,481,444, there is use of a piston force to give torsion, which is measured primarily for obtaining a given weight. None of the prior art devices incorporate independent hydraulic signals into a unified output signal representing the average of the independent signals.

SUMMARY OF THE INVENTION

The hydraulic pressure integrator of the present invention includes a base plate and a pivot plate mounted above the base plate for pivotal movement along a horizontal pivot axis which is parallel to and spaced above the base plate. A plurality of input hydraulic cylinders are mounted between the base plate and the pivot plate. A larger output hydraulic cylinder is also mounted between the base plate and the pivot plate on the opposite side of the pivot axis from the input hydraulic cylinders.

Each input cylinder includes a hollow cylindrical housing in which a slidable input piston is mounted. Each cylinder also includes an end cap having a central recess adapted to receive the lower end of the input piston when the latter moves to its lowermost position. A flexible rubber or plastic diaphragm is mounted between the cylindrical housing and the base cap of each input cylinder, the central portion of each diaphragm engaging the lower end of each input piston. An input pressure to each input cylinder is provided by means of an input pressure connection which communicates with the space below the diaphragm in each input cylinder. The end cap of each input cylinder is connected to its hollow cylindrical housing by means of a plurality of threaded screws. The base of each input cylinder is secured to the base plate also by means of a plurality of threaded screws. Preferably, although not necessarily, the input cylinders are all of the same size and are arranged in a horizontal row which is parallel to the pivot axis of the pivot plate. The input piston of each input cylinder contacts the pivot plate through an adjustment screw which is threadedly received in the pivot plate above each input piston.

The output cylinder is constructed in a manner similar to each input cylinder in that the output cylinder is comprised of a hollow cylindrical housing in which the output piston is slidably mounted and an end cap having a recess therein for accommodating the lower end of the output piston when it moves to its lowermost position; also, the output cylinder is provided with a flexible diaphragm which is received between the housing and the end cap, the central portion of the diaphragm contacting the lower end of the output piston. Furthermore, the pivot plate is provided with an adjustable threaded bolt which contacts the upper end of the output piston. A pressure connection communicates with the output cylinder in the space below the diaphragm. The housing and end cap of the output cylinder are connected together in the same manner as the input cylinders and the end cap of the output cylinder is screwed or bolted to the base plate in any convenient manner. When independent pressures are applied to the input hydraulic cylinders, a resulting force from the input pistons will create a torque on the overhead pivot plate thereby depressing the output piston to create an output pressure which will be the average of the input pressures.

DETAILED DESCRIPTION OF THE PREFERRED EMBODIMENTS

Figure 1:
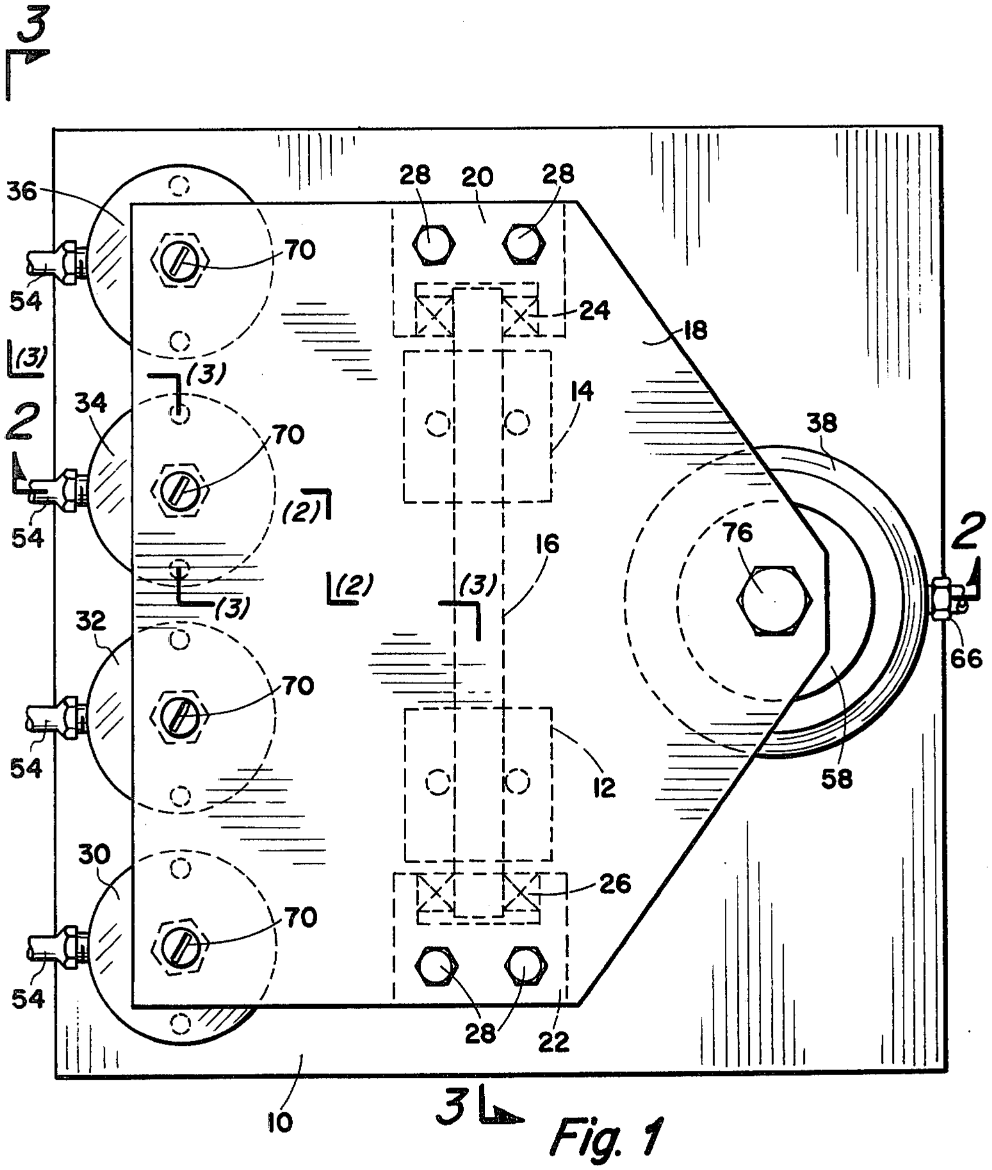
FIG. 1 represents a top plan view of a hydraulic integrator made in accordance with the present invention and with certain hidden parts being shown in broken lines.

Referring to the drawings in detail, the hydraulic integrator of the present invention includes a base plate 10 upon which are mounted a pair of spaced vertical columns 12 and 14. A horizontal pivot shaft 16 passes through suitable openings in the vertical columns 12 and 14 such that the ends of this pivot shaft 16 extend outwardly beyond these columns. A horizontal pivot plate 18 is disposed above the pivot shaft 16. A pair of bearing blocks 20 and 22 are mounted at the sides of the pivot plate 18, and these bearing blocks have bearings 24 and 26 received in suitable openings so as to engage the outer ends of the pivot shaft 16. The bearing blocks 20 and 22 are suitably attached to the pivot plate 18 by means of threaded bolts 28, for example. Based upon the above described relationship, the pivot plate 18 is adapted to pivot above the base plate 10 around a horizontal pivot axis which is the longitudinal central axis of the pivot shaft 16.

Referring now to FIG. 1, four independent hydraulic input cylinders 30, 32, 34 and 36 are mounted between the base plate 10 and the pivot plate 18 to the left of the pivot shaft 16. A single hydraulic output cylinder 38, of larger size than each of the input cylinders, is mounted between the base plate 10 and the pivot plate 18 to the right of the pivot shaft 16.

Figure 2:
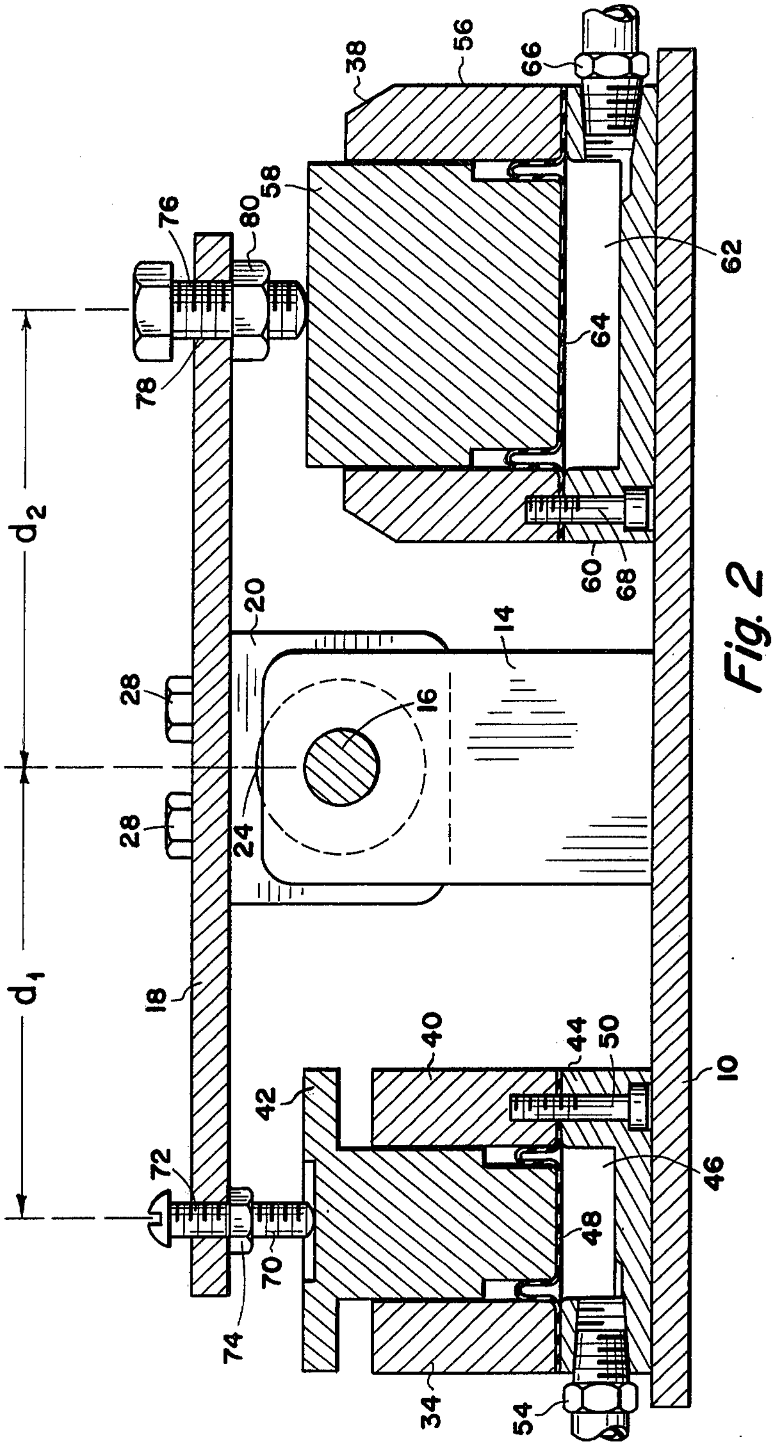
FIG. 2 is a sectional view taken along section line 2—2 of FIG. 1.
Figure 3:
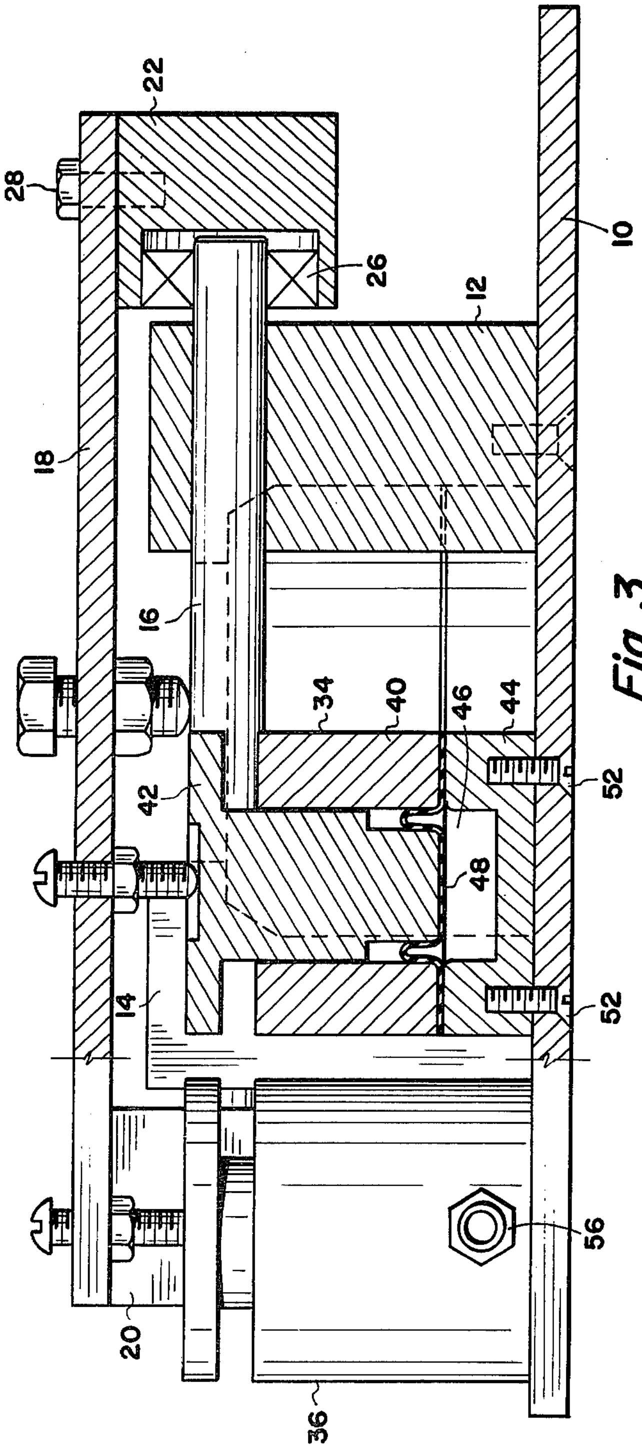
FIG. 3 is a sectional view taken along section line 3—3 of FIG. 1.

Referring now to FIGS. 2 and 3, the details of input hydraulic cylinder 34 are shown in cross-section. The following detailed description of the hydraulic cylinder 34 will also apply to the remaining input hydraulic cylinders 30, 32 and 36. Thus, each input hydraulic cylinder (for example, input hydraulic cylinder 34) is composed of an upper hollow cylindrical housing 40 in which a slidable input piston 42 is received. The bottom portion of each input hydraulic cylinder is defined by an end cap 44 which is provided with an upper recess 46 to accommodate the lower end of the piston 42 when the latter moves to its lowermost position. A flexible diaphragm 48 is disposed between the housing 40 and the end cap 44. The central portion of this diaphragm contacts the lower end of the piston 42 and the outer edges of the diaphragm are received between the housing 40 and the end cap 44 to provide a seal between the space 46 and the space above the diaphragm 48. As best shown in FIG. 2, the end cap 44 of each input hydraulic cylinder is secured to its housing 40 by means of a plurality of screws 50 (only one of which is shown). Each end cap 44 is affixed to the base plate 10 by means of a pair of flat headed screws 52, as shown in FIG. 3. Each input hydraulic cylinder is provided with an input pressure connection 54, as shown in FIG. 2, which is received in the end cap 44 and which communicates with the space 46 below the diaphragm 48. Thus, as pressure is supplied to each input hydraulic cylinder through its respective input connection 54, the pressure within the chamber 46 will be transmitted through the diaphragm 48 to the piston 42, urging the latter in an upward direction.

The output cylinder 38 is essentially the same as, although somewhat larger than, each of the input cylinders; that is, the hydraulic cylinder 38, as best shown in FIG. 2, is composed of a hollow cylindrical housing 56 in which an output piston 58 is slidably received. The output cylinder is also provided with a lower end cap 60 having a central recess 62 to accommodate the lower end of the piston 58 when the latter moves to its lowermost position. A flexible rubber or plastic diaphragm 64 is adapted to be clamped between the housing 56 and the end cap 60 in the same manner that the flexible diaphragm 48 is clamped between the housing 40 and the end cap 44. The central portion of the diaphragm 64 is adapted to engage the lower end of the piston 58. An output pressure connection 66 is attached to the end cap 60 and communicates with the space 62 below the diaphragm 64. Thus, when the piston 58 is urged downwardly, as will hereinafter appear, the output pressure in the chamber 62 will be communicated to a pressure measuring device (not shown) through the conduit (not shown) which connects with the pressure connection 66. The end cap 60 is connected to the housing 56 by means of a plurality of screws 68 (only one of which is shown), and the end cap 60 is secured to the base plate 10 by a pair of flat headed screws (not shown) in the same manner that the end cap 44 is secured to the base plate 10 by means of the flat headed screws 52.

Whereas it is possible for each input piston 42 to contact the pivot plate 18 directly, it is preferred to accomplish this result by means of an adjustment screw 70 which is received in a threaded opening 72 in the pivot plate 18 above each input piston 42. The lower rounded end of each adjustment screw 70 is adapted to contact the upper surface of its corresponding piston 42. A lock nut 74 received on each adjustment screw 70 below the pivot plate 18 is provided to permit individual adjustment and locking of each adjustment screw 70.

In like manner, the pivot plate 18 is provided with an adjustment bolt 76 received in a threaded opening 78 in the pivot plate 18 above the center of the output piston 58. The lower rounded end of the adjustment bolt 76 is adapted to bear against the upper surface of the output piston 58. A lock nut 80 received on the adjustment bolt 76 below the pivot plate 18 is provided for the adjustment and locking of the adjustment bolt 76.

As pressure is applied to the input cylinders 30, 32, 34 and 36 through their individual input connections 54, pressure will be transferred from each input piston through its associated adjustment screw 70 to the pivot plate 18 as a force tending to pivot the plate 18 in a clockwise direction with respect to FIG. 2. This resulting force or torque, in turn, will be resisted by the output piston 58 through its adjustment bolt 76, thereby creating a pressure within the chamber 62, which pressure will be transmitted to a pressure measuring or sensing device (not shown) by an interconnecting conduit (not shown) which connects with the output connection 66 as shown in FIG. 1, the input hydraulic cylinders 30 to 36 inclusive are arranged in a horizontal row parallel to the horizontal axis of the pivot shaft 16. Also, as shown in these drawings, the diameter of the piston 58 is twice the diameter of the piston 42; i.e. the working portion of the piston 42 which is received within the hollow cylindrical sleeve 40. Furthermore, the distance $d_1$ which represents the distance of the contact point of each piston 42 with its respective adjustment screw 70 as measured from the pivot axis of the pivot shaft 16 is equal to the distance $d_2$ measured from the central axis of the pivot shaft to the point of contact between the output piston 58 and its adjustment bolt 76. Utilizing the above selected parameters, the effective area of each input hydraulic cylinder is equal to approximately one quarter of the effective area of the output piston 58; stated somewhat differently, each input cylinder supplies 25 percent of the input pressure for the output cylinder 38, and since the distances $d_1$ and $d_2$ are equal, the output pressure at the output connection 66 will be an average of the four input pressures to the four individual input cylinders.

Although the distance $d_1$ for each input cylinder is equal to the distance $d_2$ for the output cylinder, it is not necessary that this relationship be maintained in all instances. The distance for a given input cylinder can be varied to compensate for a different effective pressure area of the cylinder so that each input cylinder contributes exactly 25 percent of the total input. Also, in the case of mixed units of measurement, the position of any cylinder can be varied so that it can contribute less than or more than 25 percent of the force applied to the pivot plate. Finally, although four input cylinders are shown, it is obvious that two, three, five or more input cylinders can be employed where it is desired to obtain an average of the input pressures to all cylinders.

Whereas the present invention has been described in particular relation to the drawings attached hereto, it should be understood that other and further modifications, apart from those shown or suggested herein, may be made within the spirit and scope of this invention.

What is claimed is:

1. A hydraulic pressure integrator comprising a base plate, an overhead pivot plate mounted above said base plate for pivotal movement about a horizontal pivot axis, a plurality of vertically oriented input pressure cylinders substantially equal in size mounted on said base plate and below said pivot plate, each input cylinder having an input piston slidably mounted therein, means for supplying an input pressure signal to each input cylinder allowing each input piston to rise upon input of pressure for contacting said pivot plate at a predetermined distance from said pivot axis, a single output cylinder mounted on said base plate on an opposite side of said pivot axis from said input cylinders, said output cylinder having an output piston slidably mounted therein, means for transmitting an output pressure signal produced by said output piston, said output piston contacting said pivot plate at a given distance from said pivot axis, said output piston being depressed by pivotal action of said pivot plate as a result of forces applied thereto from said input pistons to produce an output pressure signal from said output piston, said output cylinder having a large enough size in comparison to said input cylinders so that the cross-sectional area of said output piston times its given distance from said pivotal axis is equal to the total combined product of the cross-sectional areas of said input pistons times their respective predetermined distances from said pivot axis, wherein each input piston contacts said pivot plate at the same predetermined distance from said pivot axis, wherein there are four such input cylinders having input pistons of equal effective cross-sectional areas, wherein said given distance is equal to said predetermined distance and wherein the effective cross-sectional area of the output piston is equal to four times the effective cross-sectional area of each of the input pistons.

* * * * *